United States Patent
Wollborn

(10) Patent No.: US 7,697,613 B2
(45) Date of Patent: Apr. 13, 2010

(54) METHOD FOR PROVIDING AN EXTENSION CODE FOR A BINARY DESCRIPTION FOR MULTIMEDIA DATA

(75) Inventor: Michael Wollborn, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 1886 days.

(21) Appl. No.: 10/250,819

(22) PCT Filed: Dec. 21, 2001

(86) PCT No.: PCT/EP01/15194

§ 371 (c)(1), (2), (4) Date: Dec. 5, 2003

(87) PCT Pub. No.: WO02/054775

PCT Pub. Date: Jul. 11, 2002

(65) Prior Publication Data

US 2004/0109501 A1    Jun. 10, 2004

(30) Foreign Application Priority Data

Jan. 8, 2001    (EP) ................................ 011004413

(51) Int. Cl.
*H04N 7/18* (2006.01)
(52) U.S. Cl. .............................. 375/240.23; 375/240.26
(58) Field of Classification Search .................. 375/240.01–240.29
See application file for complete search history.

(56) References Cited

U.S. PATENT DOCUMENTS 7,233,953 B2 * 6/2007 Heuer et al. ................. 707/100

OTHER PUBLICATIONS

ISO/IEC, "Text of ISO/IEC CD 15938-1 Information technology—Multimedia content description interface:Systems", Doc. ISO/IEC JTC1/SC29/WG11 N3701, La Baule, France, Oct. 2000.
ISO/IEC, "Text of ISO/IEC CD 15938-2 Information technology—Multimedia content description interface: Description Definition Language", Doc. ISO/IEC JTC1/SC29/WG11 N3702, La Baule, France, Oct. 2000.
ISO/IEC, "Text of ISO/IEC CD 15938-5 Information technology—Multimedia content description interface: Description Definition Language", Doc. ISO/IEC JTC1/SC29/WG11 N3705, La Baule, France, Oct. 2000.

(Continued)

*Primary Examiner*—Andy S Rao
(74) *Attorney, Agent, or Firm*—Kenyon & Kenyon LLP

(57) ABSTRACT

For the binary representation of a description corresponding to an extended description scheme, the same principles as in the MPEG-7 binary format could in principle be used, however, the resulting binary format is different from the binary format of the original MPEG-7 description scheme, even for the identical parts of both description schemes. Means and method are provided for user or application specific extension of the binary format, where the binary format of that part of the description schemes, which is common to both the original MPEG-7 description scheme and the extended description scheme, is preserved.

13 Claims, 5 Drawing Sheets

OTHER PUBLICATIONS

Hu et al, "MD2L: Content Description of Multimedia Documents for Efficient Process and Search/Retrieval", Proceedings IEEE Forum on Research and Technology Advances in Digital Libraries, IEEE ADL '99, Baltimore, MD, May 19-21, 1999, pp. 200-213.

Nack, et al., "Der Kommende Standard Zur Beschreibung Multimedialer Inhalte-MPEG-7" Femmelde-Ingenieur, Bad Winsheim, DE, vol. 53, No. 3, Mar. 1999, pp. 1-40.

* cited by examiner

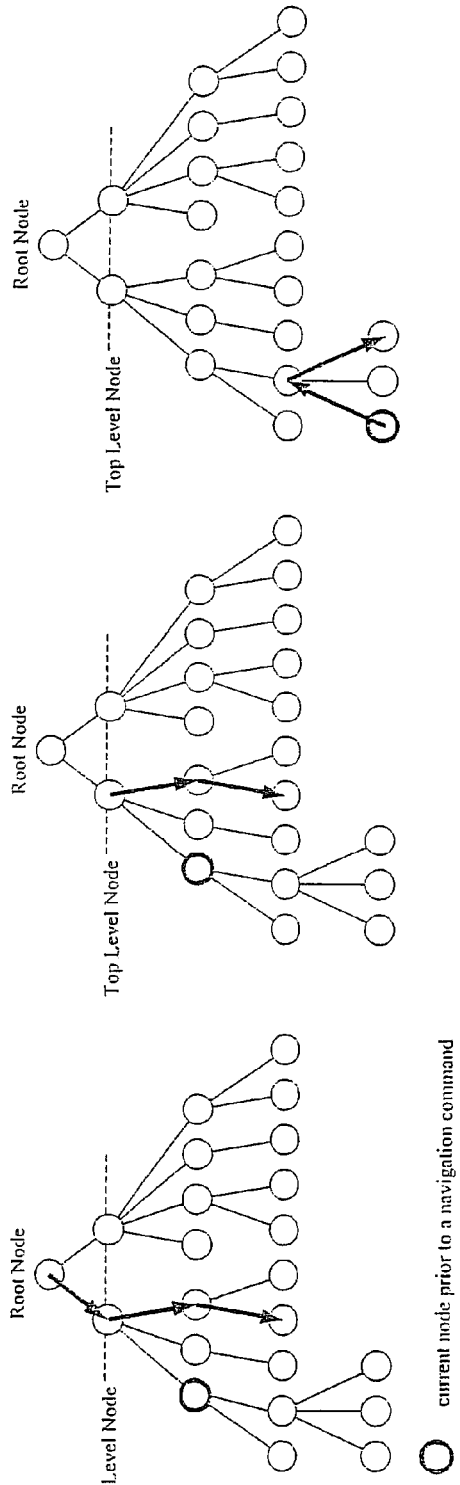
Figure 6.a  Figure 6.b  Figure 6.c
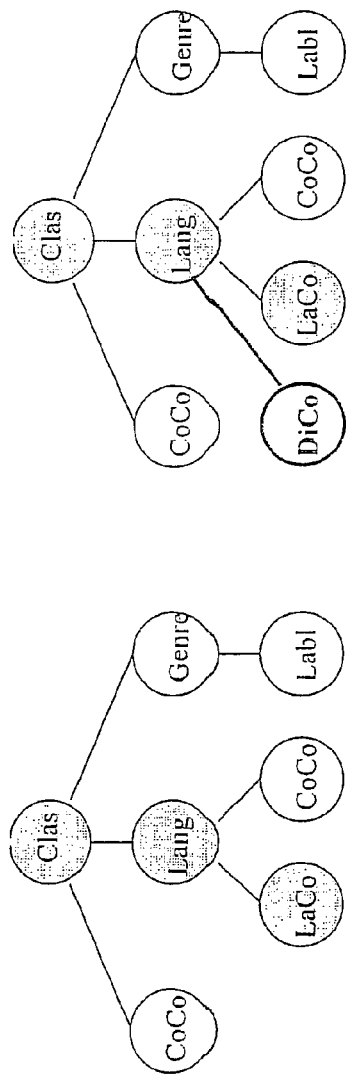
Figure 7

METHOD FOR PROVIDING AN EXTENSION CODE FOR A BINARY DESCRIPTION FOR MULTIMEDIA DATA

BACKGROUND INFORMATION

In the context of the MPEG-7 standard, description of multimedia data consists of descriptors (Ds) and description schemes (DSs), where the number of description elements (Ds or DSs) can be variable. (Reference is herein made to ISO/IEC, "Introduction to MPEG-7", Doc. ISO/IEC JTC1/SC29/WG11 N3751, La Baule, France, October 2000). All Ds and DSs in MPEG-7 are defined using the so-called Description Definition Language (DDL). (Reference is herein made to ISO/EEC, "Text of ISO/IEC CD 15938-2 Information technology—Multimedia content description interface: Description Definition Language", Doc. ISO/IEC JTC1/SC29/WG11 N3702, La Baule, France, October 2000). Further, an MPEG-7 description can be represented either in textual format (XML) or in binary format (BiM). In order to allow interoperability between applications using MPEG-7, the set of Ds and DSs comprised in MPEG-7 needs to be fixed at a certain point in time. While the DDL then still allows to extend MPEG-7 DSs, going beyond the predefined set, the meaning of these new (extended) DSs will not be known to anybody but the one who designed it.

SUMMARY

According to an example embodiment of the present invention, a user or application specific extension of multimedia description schemes in binary format is provided, where the binary format of that part of the description schemes which is common to both a predefined, e.g., MPEG-7, description scheme and an extended description scheme, is preserved.

The conventional binary format for multimedia description schemes, i.e., the so-called BiM, allows presentation of textual descriptions in binary form. Once a set of Ds and DSs is fixed, e.g., in a standard like MPEG-7, the defined Ds and DSs can in principle still be extended, however the semantic meaning of the extended Ds or DSs will only be known to their creators. Nevertheless, for many applications that use their own Ds and DSs together with e.g., MPEG-7 Ds and DSs, it would be very interesting to use the same binary format for both kinds. In principle, the BiM can be used for either kind of Ds and DSs, as long as they are based on the MPEG-7 DDL. However, if the current BiM is applied to an MPEG-7 D or DS, and to an extended DS that is based on that MPEG-7 D or DS, the binary format of both DSs will be different, even for those parts of the DSs that are identical in both cases.

One advantage of the example embodiment of the present invention is that it provides means which allow keeping the binary format of the identical parts of a predefined, e.g. MPEG-7, DS and of an extended DS the same, so that only the binary format for the extension part differs. This is achieved by including the extension tree branch code in the multimedia data binary format.

As a further aspect of the present invention, the extension tree branch code TBC can be used together with a position code.

Another aspect of the present invention is that, an MPEG-7 specific extension tree branch code (TBC) may be included into the tree branch code (TBC) table in addition or alternatively. This MPEG-7 specific extension TBC may be used for extensions of the MPEG-7 standard Ds and DSs, that are very likely to be defined in a future version 2, 3, etc. The inclusion of such an MPEG-7 specific extension TBC would allow a forward compatibility of the MPEG-7 standard up to a certain extent. Forward compatibility means here, that MPEG 7 Version 1 decoders could decode at least that part of an MPEG-7 Version 2+ DS, which is conformant to an MPEG-7 Version 1 DS. Furthermore, it would be very easy to integrate already existing MPEG-7 Version 1 content into future MPEG-7 DSs which are derived from Version 1 DSs.

BRIEF DESCRIPTION OF THE DRAWINGS

Example embodiments of the present invention are illustrated in the figures and explained in detail in the description that follows.

FIG. 6.a shows an absolute path with respect to a root node.

FIG. 6.b shows an absolute path with respect to a top level node.

FIG. 6.c shows a relative path with respect to a current node.

FIG. 7 shows a tree representation of an MPEG-7 DS and an extended MPEG-7 DS.

DETAILED DESCRIPTION

Figure 1:
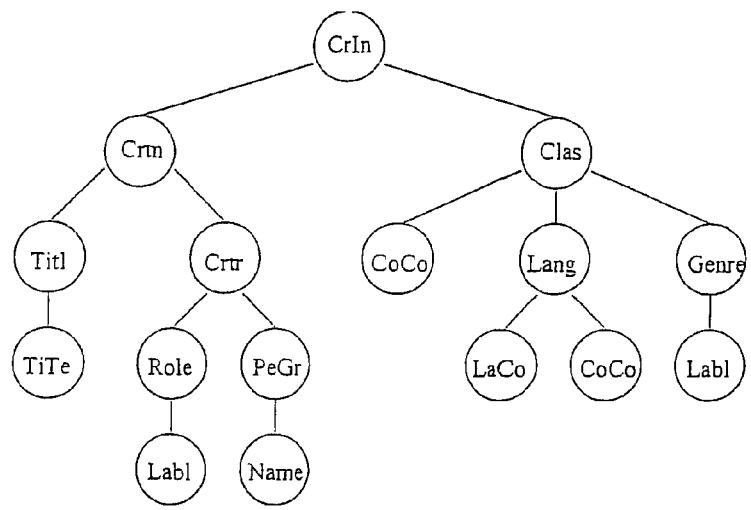
FIG. 1 shows a tree representation of an MPEG-7 description for a specific example.

Before discussing the details of the present invention, some terms especially used in MPEG-7 are presented.

In the context of the MPEG-7 standard that is currently under development, description structures for the description of audio-visual data content in multimedia environments are defined. Therefore, descriptions (Ds) and description schemes (DSs) are defined, using the so-called Description Definition Language (DDL). In the context of the remainder of this document, the following terms are used:

Data: Data is audio-visual information that will be described using MPEG-7, regardless of storage, coding, display, transmission, medium, or technology.

Feature: A Feature is a distinctive characteristic of the data which signifies something to somebody.

Descriptor (D): A Descriptor is a representation of a Feature. A Descriptor defines the syntax and the semantics of the Feature representation.

Descriptor Values (DV): A Descriptor Value is an instantiation of a Descriptor for a given data set (or subset thereof) that describes the actual data.

Description Scheme (DS): A Description Scheme specifies the structure and semantics of the relationships between its components, which may be both Descriptors (Ds) and Description Schemes (DSs).

Description: A Description consists of a DS (structure) and the set of Descriptor Values (instantiations) that describe the Data.

Coded Description: A Coded Description is a Description that has been encoded to fulfil relevant requirements such as compression efficiency, error resilience, random access, etc.

Description Definition Language (DDL): The Description Definition Language is a language that allows the creation of new Description Schemes and, possibly, Descriptors. It also allows the extension and modification of existing Description Schemes.

The lowest level of the description is a descriptor. It defines one or more features of the data. Together with the respective DVs it is used to actually describe a specific piece of data. The next higher level is a description scheme, which contains at least two or more components and their relationships. Components can be either descriptors or description schemes. The highest level is the description definition language. It is used for defining the MPEG-7 Ds and DSs, and it can also be used in order to define a new, user or application specific DS, e.g. by extending an already existing DS defined in the context of MPEG-7.

There are two possibilities to represent MPEG-7 descriptions. The first is a textual representation by means of the eXtended Markup Language (XML). This representation is human readable, however it can be quite verbose. The second possibility is a binary representation, the Binary format for MPEG-7 Data (BiM). The BiM is not human readable, but it allows a bandwidth efficient storage and transmission of the MPEG-7 data, random access to certain components of a DS and it allows flexible transmission order of the DS components. The following sections describe the textual and the binary format of MPEG-7 descriptions in more detail.

The textual format for MPEG-7 data is based on the XML language. It exists of so-called "XML tags", that define the structure and the meaning of the data in between the tags. The description is built up hierarchically, and for each opening XML tag that defines the start of a DS component there is also a corresponding closing XML tag that defines the end of the DS component. An example for a very simple DS is given below. The definition of the DS is made using the DDL and can be found in the MDS part of MPEG-7. (Reference is herein made to ISO/IEC, "Text of ISO/IEC CD 15938-5 Information technology—Multimedia content description interface: Description Definition Language", Doc. ISO/IEC JTC1/SC29/WG11 N3705, La Baule, France, October 2000).

```
<CreationInformation>
    <Creation>
        <Title type="original">
            <TitleText xml:lang="en">Help</TitleText>
        </Title>
        <Creator>
            <Role CSName="MPEG_roles_CS" CSTermID="47">
                <Label xml:lang="en">presenter</Label>
        </Role>
        <PersonGroup>
        <Name>The Beatles</Name>
</PersonGroup>
</Creator>
</Creation>
<Classification>
    <CountryCode>de</CountryCode>
    <Language>
        <LanguageCode>en</LanguageCode>
    <CountryCode>en</CountryCode>
    </Language>
    <Genre CSName="Escort2_4:Content" CSTermId="2">
        <Label xml:lang="en">Rock</Label>
    </Genre>
</Classification>
</CreationInformation>
```

The text in the brackets ("< ... >") represents the opening and closing XML tags. The text between the tags represents the data values of the description. The given example describes the title, the presenter and the genre classification of an audio track called "Help" from the English Group "The Beatles". The description can also be imagined as a description tree, like shown in FIG. 1. Here, the actual data is contained in the leafs of the tree, while the structure is given by the respective branch nodes. This tree representation is very helpful for understanding the binary format for MPEG-7 data, which is described in the following section.

The state of the art for the binary format for multimedia descriptions as referred to in connection with the present invention is given by the MPEG-7 BiM, which is described in detail in ISO/IEC, "Text of ISO/IEC CD 15938-1 Information technology—Multimedia content description interface: Systems", Doc. ISO/IEC JTC1/SC29/WG11 N3701, La Baule, France, October 2000. Here, the binary format is explained to the extent necessary to understand the present invention.

Figure 2:
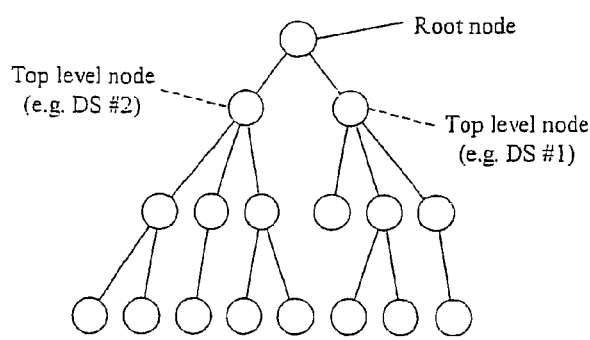
FIG. 2 shows an example for a tree representation of MPEG-7 description.

In general, each MPEG-7 description starts with a so-called MPEG-7 root element, which can contain one or more MPEG-7 description schemes. Those MPEG-7 DSs that are children of a root element are in the following referred to as "top level elements". Since all MPEG-7 descriptions are hierarchically defined, they can be interpreted as a description tree, as shown in FIG. 2.

Figure 3:
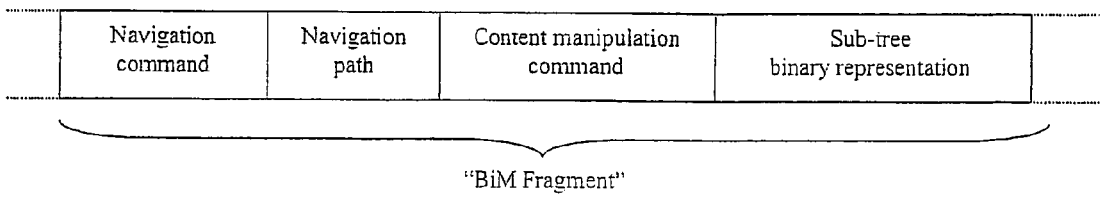
FIG. 3 shows the structure of a BiM fragment.

Since a tree representation of the description is used, the root element and the top-level element are also referred to as "root node" and "top-level node" in the remainder of this document. This tree representation will also be used in order to describe how the binary format is decoded. When the root node information has been received by the decoder, the remainder of the bitstream consists of so-called BiM fragments. Each BiM fragment looks in principle like shown in FIG. 3.

As shown, a BiM fragment consists mainly of 4 parts, which will be shortly described in the following. The first part is the so-called "navigation command", which tells the decoder which instantiated part of the description scheme it will receive next. Three kinds of addressing description elements are possible:

relative addressing with respect to the node in which the decoder is currently;

absolute addressing with respect to the current top-level node of the DS in which the decoder is currently; and absolute addressing with respect to the root node.

The next part of the BiM fragment is the navigation path, i.e., the absolute or relative address of the tree node for which the decoder will receive the information contained in the BiM fragment. The address (also referred to as identifier or ID) of the top-level DSs consists of an 8 bit code that is specified in the following table. In order to be able to leave the root node and thus to finish the MPEG-7 bitstream, in addition to the top-level DS IDs, a specific bit code is present which signals the "exit root" command. The addresses for subsequent sub-elements (children) of top-level DSs, are calculated using local path codes, in the remainder of this document also referred to as "tree-branch-codes".

The third part of a BiM fragment is a so-called "content manipulation command", which tells the decoder what kind of content manipulation it receives for the node it just has been sent to by the navigation. Three possible commands are provided, i.e., "add" a sub-tree, "update" a sub-tree and "delete" a sub-tree; the sub-tree includes the node element in which the decoder currently is. Then the command is executed: in case of "add" or "update", the content of the sub-tree is contained in the fourth component of the BiM fragment; in case of "delete" the fourth component of the BiM fragment is empty. After the command has been executed (i.e. the sub-tree information is decoded or the existing sub-tree is deleted), the decoder implicitly goes back to its parent node.

The content manipulation section of the BiM Fragment is composed of two parts: the content manipulation command and the subtree binary representation. After terminating a navigation command including the navigation path, a content manipulation command is expected. Likewise, after terminating a content manipulation command including the binary representation of a subtree, a navigation command is expected which is the beginning of a new BiM Fragment. When initializing the decoder, the current node is defaulted to the ROOT node and a navigation command is expected. The code tables for the for the content manipulation commands defined in BiM are shown in Table 1 below.

TABLE 1

Code Table of Content Manipulation Commands
Code table for content manipulation commands

| Code Word | Command Name | Specification |
|---|---|---|
| 000 | — | Reserved |
| 001 | AddSubtree | Add the content for the current node including ist subtree only if the current node is empty with respect to the transmitted subtree |
| 010 | UpdateSubtree | Update the content for the current node including its subtree even if existing content is going to be overwritten |
| 011 | DeleteSubtree | Delete the current node inlcuding its subtree |
| 100–110 | — | Reserved |
| 111 | ESCAPE | Reserved for future extension |

Figure 4:
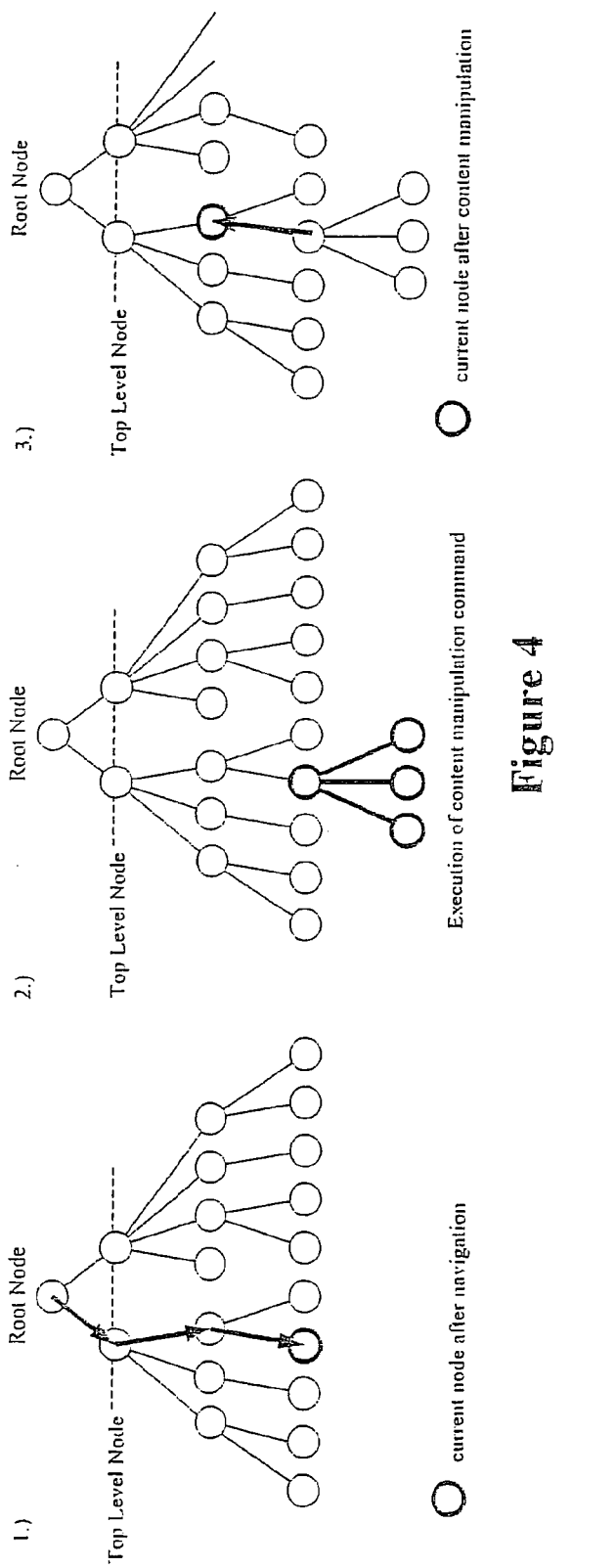
FIG. 4 shows the positions of the current mode for different states within a BiM fragment.

Commands are applied to the current node. The current node (resp. position in the tree of the description) after navigation is the node referred to by the complete navigation path, excluding the termination TBC (see FIG. 4). The content manipulation command (add, update, delete) is then applied to the subtree including the current node itself. After the content manipulation command has been issued, the current node is set to the father of the node after navigation.

The command code table contains the following codes:

AddSubtree: adds the subtree including the current position in the tree. The command is followed by a binary representation of the complete subtree. After the AddSubtree command is issued, the current node is set to the father of the current node after navigation.

UpdateSubtree: updates the subtree including the current position in the tree. The command is followed by a binary representation of the complete subtree. After the UpdateSubtree command is issued, the current node is set to the father of the current node after navigation.

DeleteSubtree: deletes the subtree including the current position in the tree. After the DeleteSubtree command is issued the current node is set to the father of the current node after navigation.

If the current node is an element or attribute of simple type then the binary content representation is following directly after the command. After the command is executed, the decoder returns into the navigation mode.

The navigation section of the BiM Fragment is divided into two parts: The navigation command and the navigation path. The navigation command has a fixed bit length of 2 bits and is followed by the navigation path of variable length. The navigation path is composed of consecutive Tree Branch Codes (TBCs) where each TBC describes a fraction of the path at a node within the tree of the description. Thus, the navigation path is a sequence of local navigation paths which specify a tree branch at each node contained in the path through the tree (see FIG. 6). The navigation command specifies how the navigation path has to be interpreted, as specified in Table 2.

TABLE 2

Code Table of Navigation Commands
Code table for navigation commands

| Code | Navigation Path | Navigation Command |
|---|---|---|
| 00 | ID_of_TopLevelElement + <TBCs> | Navigate in absolute addressing mode from the ROOT node of the MPEG-7 description to the node specified by the ID of the top level node and by the subsequent TBCs. |
| 01 | <TBCs> | Navigate in absolute addressing mode from the current top level node to the node specified by the TBCs. |
| 10 | <TBCs> | Navigate in relative addressing mode from the current node to the node specified by the TBCs |
| 11 | — | Reserved |

The <TBCs> which are parameters of the navigation command and follow the navigation command code in the bitstream are generated from the MPEG-7 Schema on which the instantiated description is based on. The schema definition specifies the possible children of one node in the description which have to be addressed by different TBCs. In the schema definition, the possible types of children are specified and their maximal number of occurrences. Accordingly to address tree branches within an instantiated element resp. node of the description, the TBC contains the specification of the children element (SchemaBranch) and the position if it can be instantiated more than once. A complete navigation path is composed as an ordered list of consecutive Tree Branch Codes (TBCs).

A code table and its TBCs are specific for every named element of complexType or named complexType in the description scheme. For navigation, the type of the instantiated element also determines the code table which is used. Thus, all elements resp. nodes of the same complex type have the same code table. Each child element and attribute of a node is assigned a code word that refers to it. These code words are called Tree-Branch-Codes (TBC) and are generated from the description scheme by a normative algorithm described in the following.

As already mentioned above, the TBC are composed of two parts: the SchemaBranch which corresponds to the different child element definitions specified in the schema and the position which is only present if according to the schema definition multiple occurrences of this child are possible. For navigation within the description tree, there is also a code to refer to the father node. Furthermore, a code word is used to terminate a path and implicitly switch to the command mode. Table 3 shows the prototype of such a code table.

TABLE 3

Prototype of a Tree Branch Code Table of an
Element or named Complex Type
Element or ComplexType name

| TBC | | |
| --- | --- | --- |
| #SchemaBranch | #position | Tree Branch |
| 000 | — | Reference to father |
| 001 | Pos. Code | Reference to first child |
| 010 | Pos. Code | Reference to second child |
| 011 | ... | |
| 100 | | |
| . | | |
| . | | |
| . | | |
| 111 | — | This TBC signals the termination of the navigation path. Please note that after having received this TBC, the decoder is assumed to be in command mode for receiving further content manipulation commands |

The assignment of the TBC is performed according to the following rules:

The number of different children is known from the description scheme and defines the length of the SchemaBranch bitfield in the TBC according to the following rule: $\lceil ld(\text{\#of child elements}+\text{\# of attributes}+2)\rceil$, where ld is the logarithm to basis two and $\lceil x \rceil$ determines the smallest integer y for which $y \geq x$ is true.

The all-zero SchemaBranch code is always assigned to the reference to the father node.

The SchemaBranch codes referring to the children are assigned sequentially in the order these are defined in the schema definition of this named element or type in the respective part of ISO/IEC 15938.

The all ones SchemaBranch code is always used for terminating the path and switching to command mode.

Figure 5:
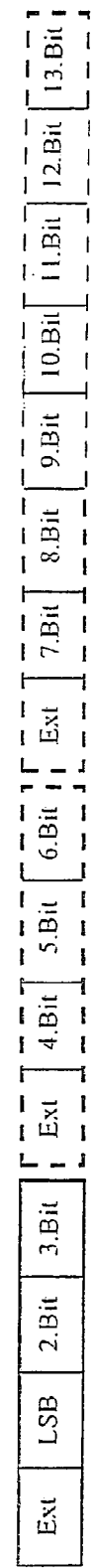
FIG. 5 shows a bit representation of positions for elements with occurrences.

If a child can have multiple occurrences, then the field <#position>specifies the number of the child in the instantiated description according to the following rule: The bit representation of the field #position is the minimal number of bits needed to represent the number of maxOccurs in the schema definition. If the number of bits exceeds 3, then the first bit (Ext) specifies if an extension of 4 bits is present (see FIG. 5). These four bit have the same semantic as the previous four bits except that in the following the extension is 8 bits with the first one reserved to signal an extension.

Elements which are grouped in a substitution group have additionally to code the address within that substitution group as an attribute after the TBC (this is not shown in the example figure above). This additional code is called SubstGrpSelect. Each element within an substitution group is assigned a SubstGrpSelect. The SubstGrpSelect codes referring to the elements are assigned sequentially starting from zero in the order these are defined in the schema definition.

Attributes, Elements of simpleType and named simpleTypes are represented by one leaf-table. A prototype of such a leaf-table is shown in Table 4.

TABLE 4

Prototype of a Tree Branch Code Table of an
Element or named Simple Type
Element or SimpleType name

| TBC | Tree Branch |
| --- | --- |
| | Terminate navigation and switch to command mode |

A path is constructed by concatenating TBCs. As every node except of the leaf node has a reference to its father, it is also possible to move upwards in the description tree hierarchy when using a relative path.

Absolute and relative navigation paths are aimed at locating an instance node within the tree structure to which the subsequent content manipulation command applies. While an absolute path expresses the way to go from the MPEG-7 description root of the instance structure or the Top Level Node of the current node to the target element, a relative path is intended to specify the path starting from current position respectively node (see FIG. 6).

The present invention deals with an extension of the navigation mode, and in particular with extending the methodology of the so-called tree branch codes. This will be described in detail in the following sections.

The conventional binary format for multimedia description schemes, i.e., the so-called BiM, allows to present textual descriptions in binary form. Once a set of Ds and DSs is fixed, e.g., in a standard like MPEG-7, the defined Ds and DSs can in principle still be extended, however the semantic meaning of the extended Ds or DSs will only be known to their creators. Nevertheless, for many applications that use their own Ds and DSs together with e.g., MPEG-7 Ds and DSs, it would be very interesting to use the same binary format for both kinds. In principle, the BiM can be used for either kind of Ds and DSs, as long as they are based on the MPEG-7 DDL. However, if the current BiM is applied to an MPEG-7 D or DS, and to an extended DS that is based on that MPEG-7 D or DS, the binary format of both DSs will be different, even for those part of the DSs that are identical in both cases. This example is also shown in FIG. 7. Here, a simple MPEG-7 DS and an extended DS are shown. The extended DS is derived from the MPEG-7 DS by adding one node "DiCo" to the node "Lang". However, since the TBC tables for each node depend on the actual number of its children, the address of the node "LaCo" differs for the both cases: in the MPEG-7 case it would be (relative to the node "Clas") "010 001 111". For the extended DS the address would be (relative to the node "Clas") "010 010 111". As can be seen, the addresses of the children of that node, where the extension is placed, change, and thus those parts of the MPEG-7 binary format will also change.

An advantage of the present invention is that it provides means which allows keeping the binary format of the identical parts of a predefined, e.g., MPEG-7, DS and of an extended DS the same, so that only the binary format for the extension part differs. This is achieved by including an "extension tree branch code" in the BiM, which signals that beyond this code some extension with respect to the predefined DSs will follow. By this, it is possible to split an extended DS into two parts: one that is identical to the base DS, i.e., that pre-defined (e.g., MPEG-7) DS where the extended DS is based upon, and another part that describes the extension of the DS with respect to the base DS. The first part can then be represented by one or more BiM fragments, and also the second part. This way it is very easy to extract the MPEG-7 conformant part of an extended DS without having to transcode it. Further, it is also very easy for users of extended DSs to access and use MPEG-7 DSs which are part of their extended DSs, again without having to transcode the complete content. Since there will be many applications with very different needs, that may however partly use MPEG-7 DSs but probably would like to extend them in order to serve their needs, the easy combination of MPEG-7 and non MPEG-7 DSs may be of high importance in the future.

The general idea of the present invention is to include an "extension tree branch code" in the BiM, that allows to signal that after this code the extension part of an extended pre-defined (e.g., MPEG-7) DS follows. Therefore, an item "extension tree branch code" is included in the Table 3 for the tree branch codes of complex types, as shown below.

TABLE 5

Prototype of a Tree Branch Code Table of an Element or named Complex Type, including an "extension tree branch code" for user or application specific extensions of predefined Ds or DSs
Element or ComplexType name

TBC

| #SchemaBranch | #position | Tree Branch |
|---|---|---|
| 000 | — | Reference to father |
| 001 | Pos. Code | Reference to first child |
| 010 | Pos. Code | Reference to second child |
| 011 | ... | |
| 100 | | |
| . | | |
| . | | |
| . | | |
| 110 | — | This TBC signals that after this branch an extension of a pre-defined MPEG-7 or DS follows, whose semantics and meaning are not specified in the present standard, but depend on the user or application of the extended DS. |
| 111 | — | This TBC signals the termination of the navigation path. Please note that after having received this TBC, the decoder is assumed to be in command mode for receiving further content manipulation commands |

In order to construct such a TBC table for a named complex type or an element, the original rules for assigning the TBCs are modified as follows:

The number of different children is known from the description scheme and defines the length of the SchemaBranch bitfield in the TBC according to the following rule: $\lceil ld(\#of\ child\ elements+\#\ of\ attributes+3)\rceil$, where ld is the logarithm to basis two and $\lceil x \rceil$ determines the smallest integer y for which $y \geq x$ is true.

The all-zero SchemaBranch code is always assigned to the reference to the father node.

The SchemaBranch codes referring to the children are assigned sequentially in the order these are defined in the schema definition of this named element or type in the respective part of ISO/IEC 15938.

The SchemaBranch code directly preceding the all-one SchemaBranch code is always used in order to present the extension tree branch code.

The all-one SchemaBranch code is always used for terminating the path and switching to command mode.

If a child can have multiple occurrences, or in case of an extension TBC that may have multiple occurrences, then the field <#position>specifies the number of the child in the instantiated description according to the following rule: The bit representation of the field #position is the minimal number of bits needed to represent the number of maxOccurs in the schema definition. If the number of bits exceeds 3 then the first bit (Ext) specifies if an extension of 4 bits is present (see FIG. 5). These four bit have the same semantic as the previous four bits except that in the following the extension is 8 bits with the first one reserved to signal an extension.

Figure 8:
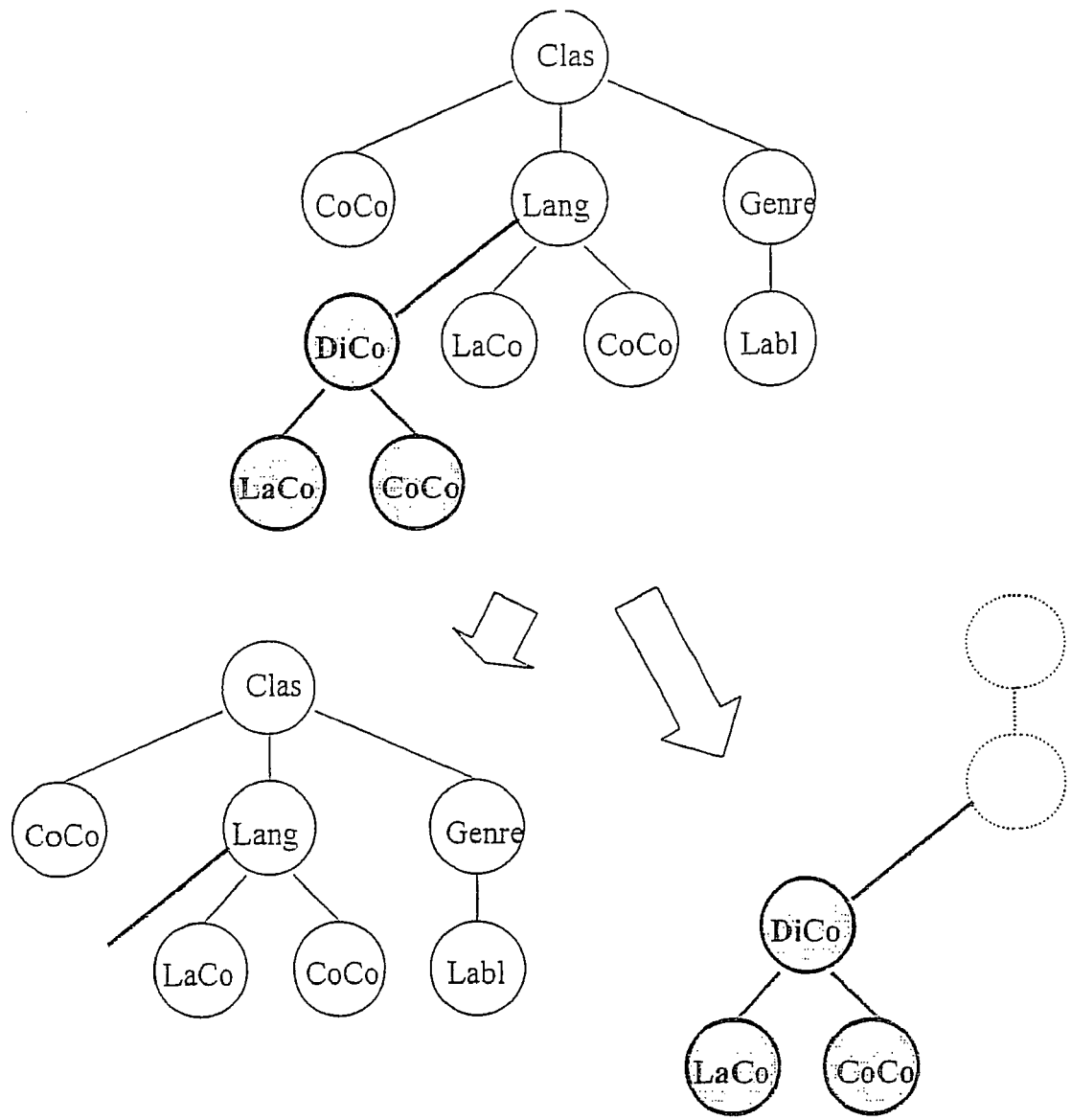
FIG. 8 shows an example for use of a single extension TBC in one DS mode.

With this modification, it is now possible to use the BiM for pre-defined (e.g., MPEG-7) Ds and DSs as well as for extended DSs based on MPEG-7 Ds and DSs, and to keep the binary format for the MPEG-7 conformant part of both DSs identical. In addition, the same BiM encoders and decoders can be used for pre-defined (e.g. MPEG-7) and for extended Ds and DSs. An example for the use of the extension TBC, visualised by a tree representation of the extended DS instance, of the MPEG-7 base DS and of the extension part, is shown in FIG. 8. As can be seen, each of the two sub-trees can now be represented by one or more BiM fragments. However, the format of the BiM fragment(s) of the MPEG-7 conformant DS part is the same than for the MPEG-7 DS itself.

Figure 9:
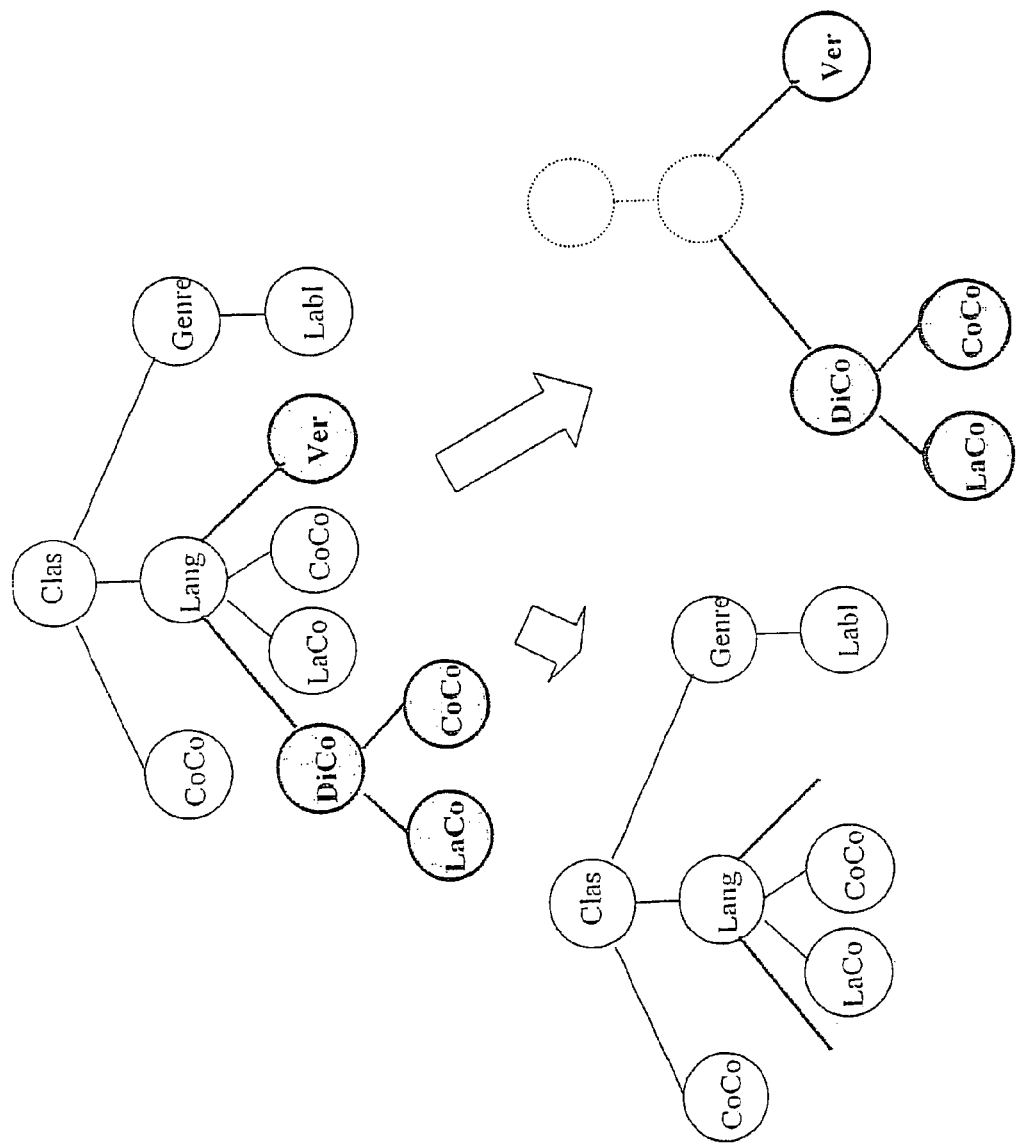
FIG. 9 shows an example for use of multiple extension TBCs in one DS node.

According to a further aspect of the present invention, the extension tree branch code TBC can be used together with a position code (see e.g. table 5). This position code is used in case of children of a DS node that may occur multiple times. With the extension TBC as defined in Table 5, where the position code is disabled (table entry "--"), only one extension TBC may occur in one DS node. As an option, it would also be possible to enable the position code and thus to allows more than one extension TBC in one DS node. This would in particular be of advantage for cases where the extension of the DS would lead only to small changes. An example for multiple extension TBCs, again visualised by a tree representation of the respective extended DS parts, is shown in FIG. 9. Again all the sub-trees could be represented by one or more BiM fragments, and the format of the MPEG-7 DS BiM fragment would be preserved.

Another aspect of the present invention is that, an MPEG-7 specific extension tree branch code (TBC) could be included into the tree branch code (TBC) table in addition or alternatively. This MPEG-7 specific extension TBC could be used for extensions of the MPEG-7 standard Ds and DSs, that are very likely to be defined in a future version 2, 3, etc. The inclusion of such an MPEG-7 specific extension TBC would allow a forward compatibility of the MPEG-7 standard up to a certain extent. Forward compatibility means here, that MPEG-7 Version 1 decoders could decode at least that part of an MPEG-7 Version 2+ DS, which is conformant to an MPEG-7 Version 1 DS. Furthermore, it would be very easy to integrate already existing MPEG-7 Version 1 content into future MPEG-7 DSs which are derived from Version 1 DSs.

The invention claimed is:

1. A computer readable medium having a computer program, which is executable by a processor, comprising:
   a program code arrangement having program code for providing an extension code for a binary description of multimedia data by performing the following;
   using the extension tree branch code to signal that one part of a description scheme for the multimedia data is identical to a predefined base description scheme; and using the extension tree branch code to signal that another part of the description scheme describes an extension of the description scheme with respect to the predefined base description scheme.

2. The computer readable medium according to claim 1, wherein said predefined base description scheme is an MPEG-7 description scheme.

3. The computer readable medium method according to claim 1, further comprising:
splitting an extended description scheme into two parts using the extension tree branch code, one of the parts being identical to the predefined base description scheme, and another of the parts describing the extension, which follows beyond the extension tree branch code.

4. The computer readable medium method according to claim 3, wherein the one of the parts is represented by at least one BiM fragment in the binary format which allows extracting a MPEG-7 conformant part of an extended description scheme without transcoding.

5. The computer readable medium according to claim 1, further comprising:
providing a position code wherein the extension tree branch code together with the position code enable more than one extension in one description scheme node.

6. The computer readable medium according to claim 1, further comprising:
using an MPEG-7 specific extension tree branch code for extensions of MPEG-7 standard descriptors and description schemes to be defined and to allow forward compatibility.

7. The computer readable medium according to claim 1, wherein the multimedia data is MPEG-7 data, and wherein the binary format for the MPEG-7 data together with extensions is as follows:
a navigation command, which provides information for a decoder regarding which part of the description scheme it will receive next,
a navigation path, which provides an address of a tree node for which the decoder will receive information contained in MPEG-7 data format,
a content manipulation command, which provides information for the decoder regarding what kind of content manipulation it receives for the node just been sent to by the navigation, and
a sub-tree binary representation.

8. The computer readable medium according to claim 1, wherein an extended description scheme is split into two parts using the extension tree branch code, one of the parts being identical to the predefined base description scheme, and another of the parts describing the extension, which follows beyond the extension tree branch code, wherein said predefined base description scheme is an MPEG-7 description scheme, wherein the one of the parts is represented by at least one BiM fragment in the binary format which allows extracting a MPEG-7 conformant part of an extended description scheme without transcoding.

9. The computer readable medium according to claim 8, wherein a position code is provided in which the extension tree branch code together with the position code enable more than one extension in one description scheme node, and wherein an MPEG-7 specific extension tree branch code is used for extensions of MPEG-7 standard descriptors and description schemes to be defined and to allow forward compatibility.

10. The computer readable medium according to claim 9, wherein the multimedia data is MPEG-7 data, and wherein the binary format for the MPEG-7 data together with extensions is as follows:
a navigation command, which provides information for a decoder regarding which part of the description scheme it will receive next,
a navigation path, which provides an address of a tree node for which the decoder will receive information contained in MPEG-7 data format,
a content manipulation command, which provides information for the decoder regarding what kind of content manipulation it receives for the node just been sent to by the navigation, and
a sub-tree binary representation.

11. The computer readable medium according to claim 1, wherein a position code is provided in which the extension tree branch code together with the position code enable more than one extension in one description scheme node, and wherein an MPEG-7 specific extension tree branch code is used for extensions of MPEG-7 standard descriptors and description schemes to be defined and to allow forward compatibility.

12. The computer readable medium according to claim 11, wherein the multimedia data is MPEG-7 data, and wherein the binary format for the MPEG-7 data together with extensions is as follows:
a navigation command, which provides information for a decoder regarding which part of the description scheme it will receive next,
a navigation path, which provides an address of a tree node for which the decoder will receive information contained in MPEG-7 data format,
a content manipulation command, which provides information for the decoder regarding what kind of content manipulation it receives for the node just been sent to by the navigation, and
a sub-tree binary representation.

13. The computer readable medium according to claim 1, wherein an extended description scheme is split into two parts using the extension tree branch code, one of the parts being identical to the predefined base description scheme, and another of the parts describing the extension, which follows beyond the extension tree branch code, wherein said predefined base description scheme is an MPEG-7 description scheme, wherein the one of the parts is represented by at least one BiM fragment in the binary format which allows extracting a MPEG-7 conformant part of an extended description scheme without transcoding,
wherein the multimedia data is MPEG-7 data, and
wherein the binary format for the MPEG-7 data together with extensions is as follows:
a navigation command, which provides information for a decoder regarding which part of the description scheme it will receive next,
a navigation path, which provides an address of a tree node for which the decoder will receive information contained in MPEG-7 data format,
a content manipulation command, which provides information for the decoder regarding what kind of content manipulation it receives for the node just been sent to by the navigation, and
a sub-tree binary representation.

* * * * *